United States Patent [19]
Jikihara et al.

[11] Patent Number: 5,947,577
[45] Date of Patent: Sep. 7, 1999

[54] IMAGE PICK-UP DEVICE

[75] Inventors: Masahiro Jikihara; Ikuo Akiyama; Osamu Ishibashi, all of Tokyo, Japan

[73] Assignee: NEC Corporation, Japan

[21] Appl. No.: 08/580,505

[22] Filed: Dec. 28, 1995

[30] Foreign Application Priority Data

| Dec. 28, 1994 | [JP] | Japan | 6-327351 |
| Feb. 22, 1995 | [JP] | Japan | 7-032748 |
| May 19, 1995 | [JP] | Japan | 7-121131 |

[51] Int. Cl.[6] ............................ G03B 21/00; G03B 27/72
[52] U.S. Cl. ................................. 353/97; 353/63; 355/71
[58] Field of Search .................... 353/20, 28, 63, 353/64, 65, 66, 122, DIG. 4, DIG. 3, 97; 348/370, 96, 110; 355/67, 68, 91; 396/273, 272, 268; 359/888

[56] References Cited

U.S. PATENT DOCUMENTS

| 2,356,694 | 8/1944 | Potter | 359/888 |
| 3,700,314 | 10/1972 | Busby, Jr. | 359/888 |
| 4,018,519 | 4/1977 | Clapp | 353/28 |
| 4,629,298 | 12/1986 | Trumbull et al. | 353/28 |
| 5,027,219 | 6/1991 | Stuttler et al. | |
| 5,379,083 | 1/1995 | Tomita | 353/97 |
| 5,444,486 | 8/1995 | Mizuno et al. | 348/370 |
| 5,506,640 | 4/1996 | Orlich | 353/28 |
| 5,560,696 | 10/1996 | Orlich | 353/28 |
| 5,639,151 | 6/1997 | McNelley et al. | 353/98 |
| 5,642,206 | 6/1997 | Yamamori et al. | 348/370 |
| 5,760,882 | 6/1998 | Gulick, Jr. et al. | 359/888 |

FOREIGN PATENT DOCUMENTS

| 2846662 | 5/1979 | Germany | 359/888 |
| 58-154817 | 9/1983 | Japan | 359/888 |
| 60-189176 | of 1985 | Japan | . |

*Primary Examiner*—William Dowling
*Attorney, Agent, or Firm*—Ostrolenk, Faber, Gerb & Soffen, LLP

[57] ABSTRACT

In an image pick-up device, a document, picture, OHP (Over Head Projector) film or similar subject is laid on a stage. While the subject is illuminated by a light source unit, the resulting imagewise reflection from the subject is picked up by a television camera and transformed to a video signal. The image represented by the video signal appears on a screen in a conference room or on the individual monitor in a communication conference. Light issuing from the light source unit and offensive to the eye is prevented from leaking to the outside of the device. This, coupled with the fact that irregularity in the illumination on the subject is reduced, insures a clear-cut image. Further, the device is easy to operate and protects the working environment from deterioration due to heat generated by the light source unit.

3 Claims, 11 Drawing Sheets

IMAGE PICK-UP DEVICE

BACKGROUND OF THE INVENTION

The present invention relates to an image pick-up device for transforming with a television (TV) camera an optical image representative of a document, figure, photo, OHP (Over Head Projector) film, model or similar subject laid on a stage to a video signal, and reproducing the image represented by the video signal on a screen in a conference room or on the individual monitor in a communication conference.

A conventional image pick-up device for the above application has a stage to be loaded with a subject, a TV camera having a lens for shooting the subject, a light source unit having a lens for illuminating the subject, optics including at least two mirrors for conducting an optical image representative of the subject to the camera, and posts supporting the light source unit and camera.

The image pick-up device having the above construction has various problems left unsolved, as enumerated below.

(1) Part of the light issuing from the light source unit is apt to leak to the outside of the stage and appear on a screen or a monitor, thereby blurring the image.

(2) Shadows appear in the image on the screen or the monitor and prevent the image from being clear-cut.

(3) The camera is awkward to operate.

(4) The posts arranged around the stage obstruct, e.g., the replacement of the subject.

(5) Heat generated by the light source unit deteriorates the working environment.

(6) The lens of the camera and the lens of the light source unit are expensive, increasing the production cost of the entire device.

(7) The optical axis of the lens of the light source unit and that of the lens of the camera cannot be easily brought into coincidence, resulting in time- and labor-consuming adjustment.

(8) The illumination on the subject is irregular due to the irregular light distribution particular to the light source unit and the shading of the camera, so that the quality of the output image is limited.

SUMMARY OF THE INVENTION

It is therefore an object of the present invention to provide an improved image pick-up device capable of obviating the problems particular to the conventional device as discussed above.

In accordance with the present invention, an image pick-up device has a casing constituting a stage to be loaded with a subject. An image pick-up unit picks up an optical image representative of the subject. An illuminating unit is disposed in the casing for illuminating the subject. A reflecting member is positioned substantially just above the stage for conducting light output from the illuminating unit to the subject by reflecting the light, while conducting the optical image representative of the subject to the image pick-up unit. The illuminating unit has a light source for emitting the light, and a screen plate formed with a window for limiting the illuminating range of the light issuing from the light source. The light passed through the window is reflected by the reflecting member and then incident to the stage.

Also, in accordance with the present invention, an image pick-up device has a stage to be loaded with a subject. An image pick-up unit picks up an optical image representative of the subject. An illuminating unit illuminates the subject. A first reflecting member reflects light issuing from the illuminating unit only once to thereby directly conduct the light to the subject, while reflecting the optical image representative of the subject. A second reflecting member conducts the optical image representative of the subject and reflected by the first reflecting member.

Further, in accordance with the present invention, an image pick-up device has a stage to be loaded with a subject. An image pick-up unit picks up an optical image representative of the subject. An illuminating unit illuminates the subject. The illuminating unit has a light source for emitting light, an optical filter having transmissivity higher in its peripheral portion than in its central portion, and passes the light output from the light source therethrough, and a condensing member for condensing the light passed through the optical filter.

Moreover, in accordance with the present invention, a light source unit for an image pick-up device has a light source for emitting light, an optical filter having transmissivity higher in its peripheral portion than in its central portion, and passes the light output from the light source therethrough, and a condensing member for condensing the light passed through the optical filter.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Preferred embodiments of the image pick-up device in accordance with the present invention will be described.

1st Embodiment

Figure 1:
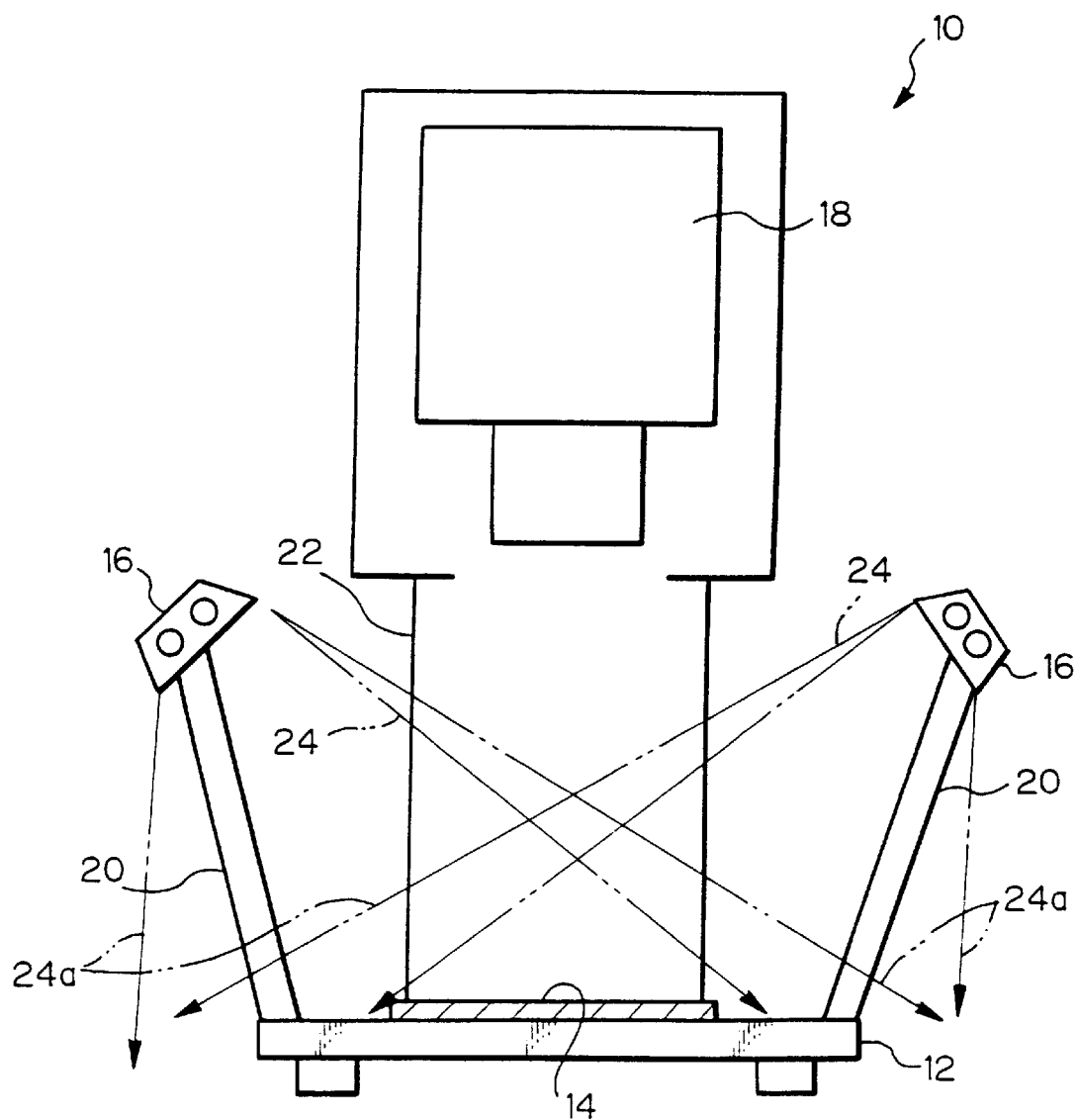
FIG. 1 is a front view of a conventional image pick-up device.

To better understand this embodiment, a brief reference will be made to a conventional image pick-up device, shown in FIG. 1. As shown, the device, generally 10, has a stage 12 to be loaded with a document or similar subject 14, a pair of light source units 16 for illuminating the subject 14, and a TV camera 18 for shooting the subject 14. The light source units 16 are respectively mounted on posts 20 extending upward from the opposite sides of the stage 12. These units 16 are so positioned as to emit light obliquely downward toward the stage 12. The camera 18 is positioned substantially just above the subject 14 and mounted on a stand 22 rising from the rear portion of the stage 12. The camera 18 is positioned to face downward. In this condition, while the light source units 16 emit light 24 toward the subject 14, the camera 18 shoots the subject 14.

The light source units 16 emit the light 24 obliquely downward toward the stage 12, as stated above. This brings about a problem that a part of the light 24 leaks to the outside of the stage 12. This part of the light not only offends the eye in a dark room where a conference is held, but also makes an image appearing on a monitor or a screen via the camera 18 obscure. Further, because the emitting direction of the light source units 16 and the shooting direction of the camera 18 are different, shadows appear in the output image and blur it. Moreover, the units 16 are arranged around the camera 18 in front of the operator of the camera 18, obstructing the manipulation of the camera 18. In addition, the posts 20 and stand 22 arranged around the stage 12 obstruct the replacement of the subject 14.

The embodiment to be described solves the above problems, particularly the previously stated problems (1) through (4).

Figure 2:
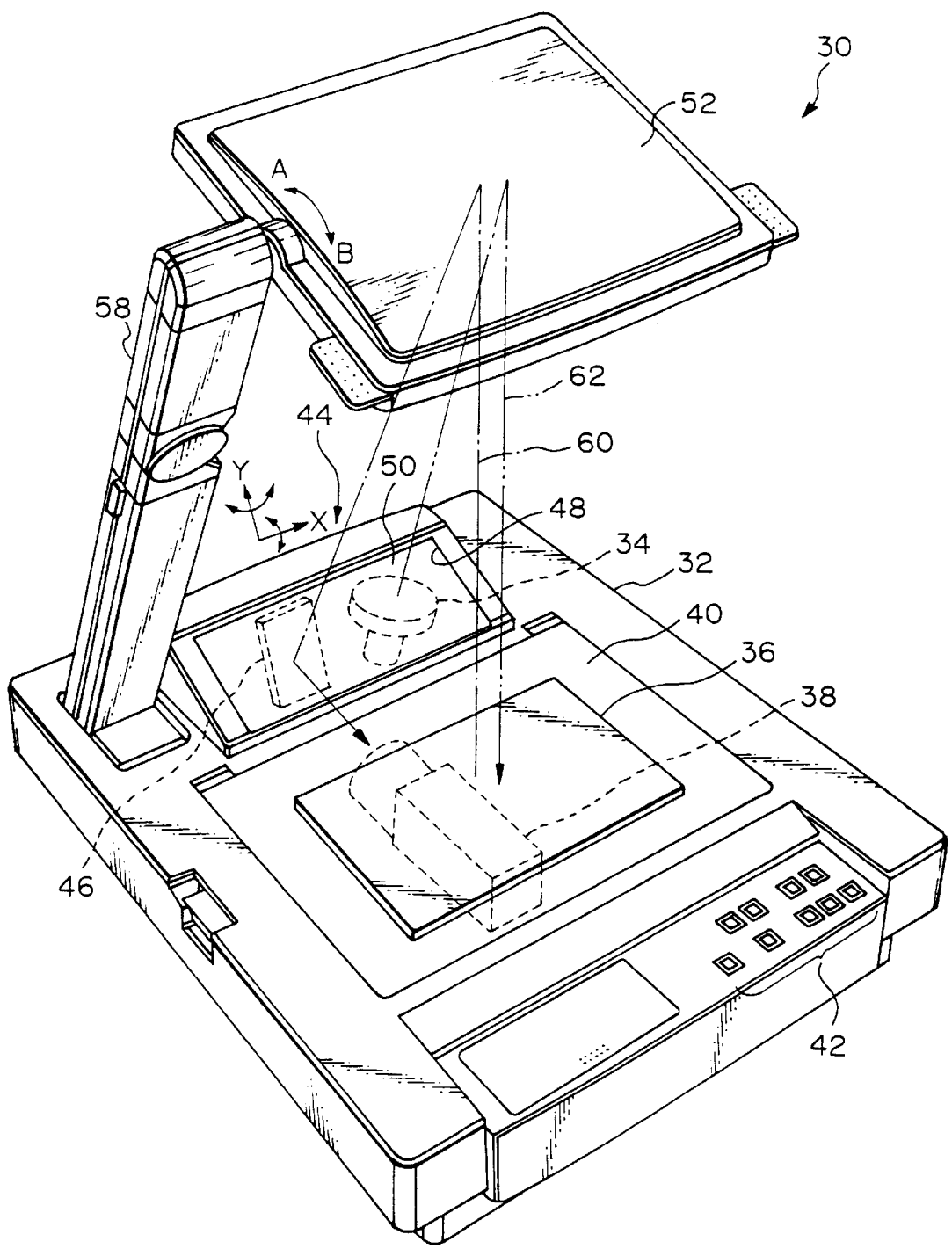
FIG. 2 is an external perspective view of a first embodiment of the image pick-up device in accordance with the present invention.
Figure 3:
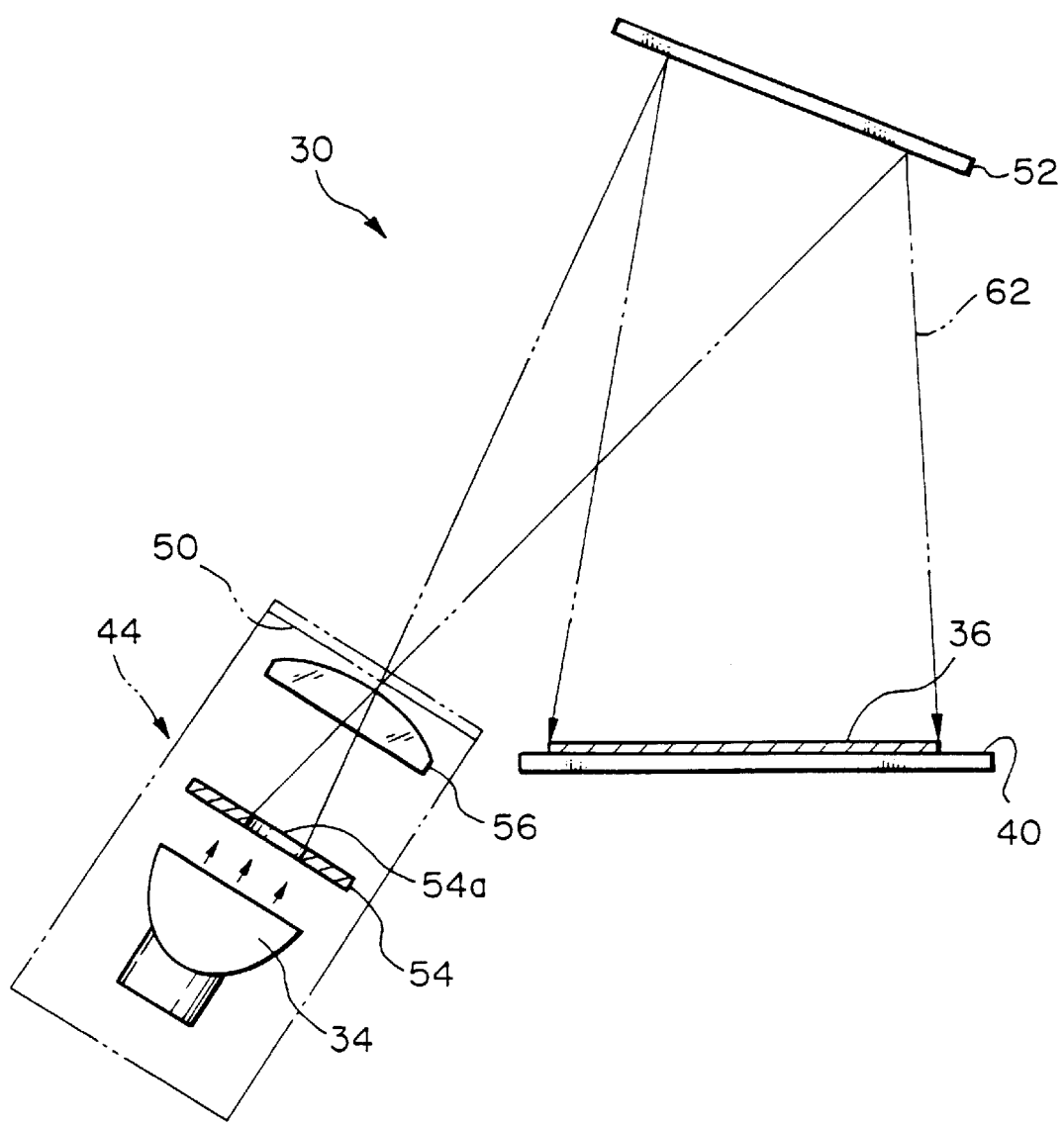
FIG. 3 shows a positional relation of a part of the first embodiment.

Referring to FIGS. 2 and 3, an image pick-up device embodying the present invention is shown and generally designated by the reference numeral 30. As shown, the device 30 has a box-like table or casing 32, a halogen lamp or similar light source unit 34 for illuminating a subject 36, and a TV camera 38 for shooting the subject 36. A stage 40 of substantially size A3 is positioned at substantially the center of the top of the table 32 and loaded with the subject 36. Switches 42 including a power ON/OFF switch and a zoom switch and a focus switch for the camera 38 are arranged on the front side of the table 32. The camera 38 is disposed in the table 32 substantially beneath the stage 40 and oriented such that its lens faces the rear of the table 32.

The light source unit 34 and a second mirror 46 are disposed in a housing portion 44 which is molded integrally with the rear portion of the table 32. The housing portion 44 rises from the surface of the table 32 and has an inclined upper surface. A rectangular window 48 is formed through the inclined upper surface. The window 48 is closed by an acrylic plate 50. A first mirror 52 is positioned substantially just above the stage 40, as will be described specifically later. The window 48 is so inclined as to face the first mirror 52. The light source 34 and second mirror 46 are positioned side by side at the same level or height. The mirror 46 is so positioned in the housing portion 44 as to reflect an optical image from the mirror 52 toward the camera 38.

A screen plate 54 is positioned in front of the light source 34 and formed with a window 54a. A condensing lens 56 is interposed between the screen plate 54 and the acrylic plate 50. An arm 58 is rotatably mounted at its lower end on one corner portion of the table 32 close to the housing section 44. The first mirror 52 is supported by the upper end of the arm 58 via a conventional tilting mechanism. The mirror 52 is tiltable to a desired angular position relative to the stage 40 in directions A and B indicated by a double-headed arrow in FIG. 2. When the device 30 is not used, the arm 58 is laid onto the table 32. When the device 30 is used, the arm 58 is raised to the position where the mirror 52 lies substantially just above the stage 40.

How the device 30 is used and operated will be described hereinafter. First, the operator of the device 30 turns on the light source unit 34 by operating preselected one of the switches 42, and then raises the arm 58 to bring the mirror 52 to the position substantially just above the stage 40. Subsequently, the operator tilts the mirror 52 in the direction A or B such that light issuing from the light source unit 34 is incident to the subject 36. In this condition, the light from the light source unit 34 is passed through the window 54a of the screen plate 54 and restricted in illuminating range thereby. The light passed through the window 54a is condensed to the range of the mirror 42 by the lens 56. Hence, the light is prevented from leaking to the outside of the mirror 52. Further, because the mirror 52 is positioned substantially just above the stage 40, the light incident to the stage 40 by way of the mirror 52 is prevented from leaking to the outside of the stage 40. Moreover, because the light source unit 34 and camera 38 are housed in the table 32, only the arm 58 is present around the table 32. This allows the operator to tilt the mirror 52 in the direction A or B and replace the subject 36 with ease.

The light incident to the subject 36 is reflected to the mirror 52 via a shooting route 60 as an image representative of the subject 36. The mirror 52 reflects the incident light to the camera 38. As a result, the subject 36 is picked up by the camera 38. Because the light source 34 and mirror 46 are positioned side by side at the same level, the shooting route 60 is coincident with an illuminating route 62 when the device 30 is seen from the side. Therefore, once the position of the mirror 52 for illuminating the mirror 52 is determined, the subject 36 can be automatically picked up by the camera 38. In addition, the image picked up by the camera 38 is free from shadows partly because the illuminating route 62 is positioned substantially just above the subject 36 and partly because the two routes 60 and 62 are coincident.

In the embodiment, the camera 38 is positioned below the stage 40 by using a space available in the table 32. Alternatively, the camera 38 may, of course, be located at any desired position within the table 32 if only the easy adjustment of the mirror 52 in the directions A and B and the easy replacement of the subject 36 suffice. In such a case, the mirror 46 may be arranged in such a manner as to be rotatable about axes X and Y (FIG. 2), i.e., in the up-and-down direction and right-and-left direction. Then, the optical axis of the mirror 46 can be varied to allow the camera 38 to pick up the subject 36 easily. If desired, the camera 38 may be located at the position of the mirror 46 in order to omit the mirror 46. This successfully reduces the number of parts of the device 30.

The illustrative embodiment having the above configuration achieves the following advantages.

(1) The light issuing from the light source unit 34 does not leak to the outside of the stage 40. This not only obviates light offensive to the eye, but also prevents light from appearing on a monitor or a screen.

(2) The second mirror 46 reflects the light incident thereto from the subject 36 via the mirror 52 to the camera 38. This, coupled with the fact that the camera 38 is housed in the table 32, reduces the number of parts existing around the stage 40 and thereby facilitates the manipulation of the mirror 52 and the replacement of the subject 36.

(3) Because the camera 38 is disposed in the space substantially beneath the stage 40, the space available in the table 32 is efficiently used while the device 30 is miniaturized.

(4) The light source unit 34 and mirror 46 are positioned side by side, so that the illuminating route 62 and shooting route 60 are substantially coincident with each other. Hence, only if the light from the light source unit 34 is positioned on the subject 36, the camera 38 can shoot the subject 36. This eliminates the need for the operation for matching the position of the subject 36 to the camera 38 and thereby implements easy and rapid preparation. In addition, the camera 38 can pick up a clear-cut image free from shadows.

2nd Embodiment

Figure 4A:
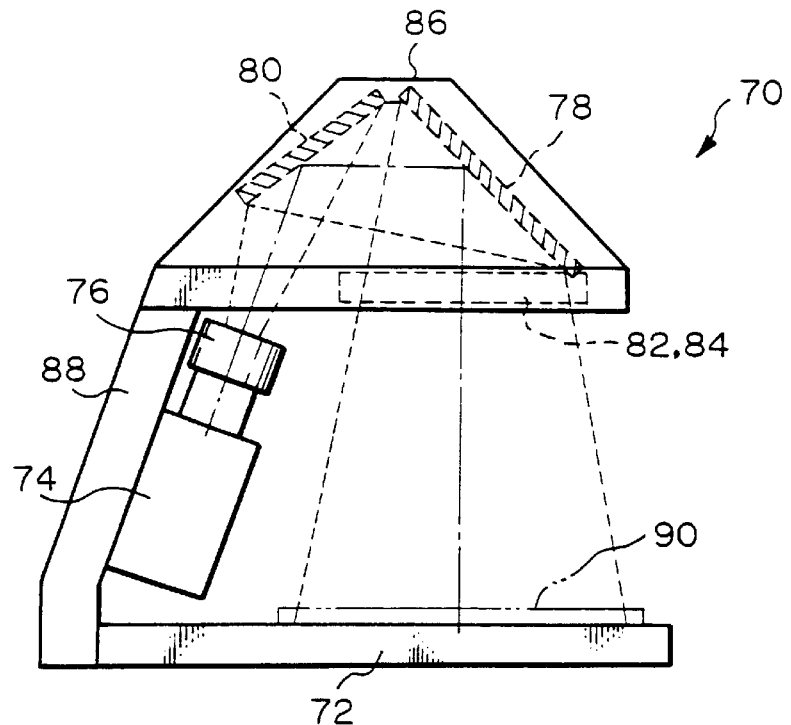
FIGS. 4A and 4B are respectively a side elevation and a front view showing another conventional image pick-up device.
Figure 4B:
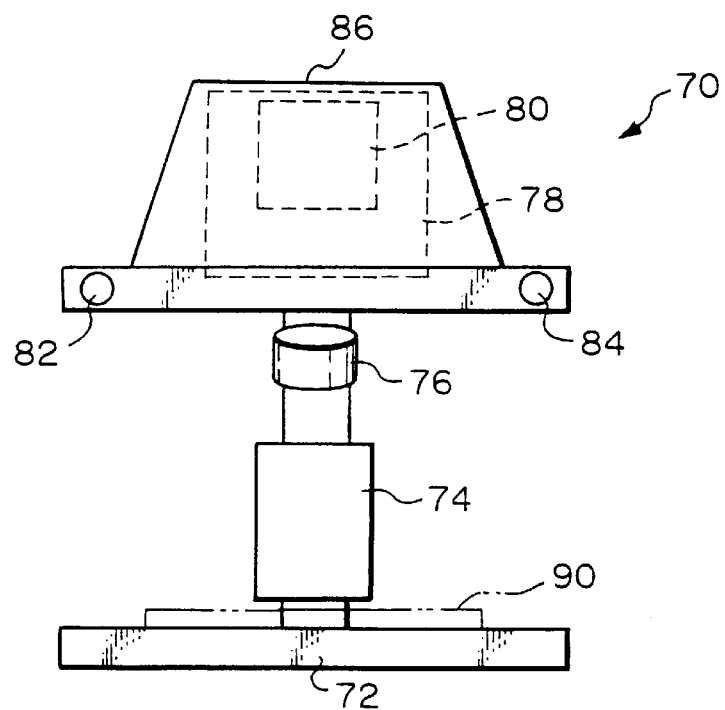

First, problems to be solved by this embodiment will be described. FIGS. 4A and 4B show another conventional image pick-up device taught in Japanese Utility Model Laid-Open Publication No. 60-189176. As shown, the device, generally 70, is made up of a stage 72 loaded with a document or similar subject 90, a TV camera 74, an image pick-up lens 76, a first mirror 78, a second mirror 80, light source units 82 and 84, a hood 86 for screening light, and a pole 88 supporting the above members. An optical image representative of the subject 90 is sequentially reflected by the mirrors 78 and 80 and then incident to the lens 76 as a noninverted image. The camera 74 transforms the incident optical image to a usual video signal. The image represented by the video signal appears on, e.g., a TV monitor, not shown. The light source units 82 and 84 are respectively connected to ground via the right and left portions of the hood 86. The document 90 is illuminated by the light source units 82 and 84 as evenly as possible.

The device 70 has a problem that because the light source units 82 and 84 are usually implemented by elongate fluorescent lamps, the light is diffused even to the outside of the document 90 and leaks to the outside of the device 70. Particularly, when the device 70 is used in combination with a large projector in, e.g., a decision room or a conference room, the illumination in the room is turned down in order to make up for low illumination particular to the projector. In this case, the light leaking from the device 70 is incident to the screen of the projector and thereby critically lowers the display quality, as often pointed out in the past. It is also known that the leaking light causes the speaker or the operator standing in front of the device 70 to get tired.

Another problem with the device 70 is that heat generated by the light source units 82 and 84 is transferred to the speaker or the operator, noticeably deteriorating the working environment. Moreover, there is a fear that the speaker or the operator touches the light source units 82 and 84 and gets burnt in the hand.

Figure 5A:
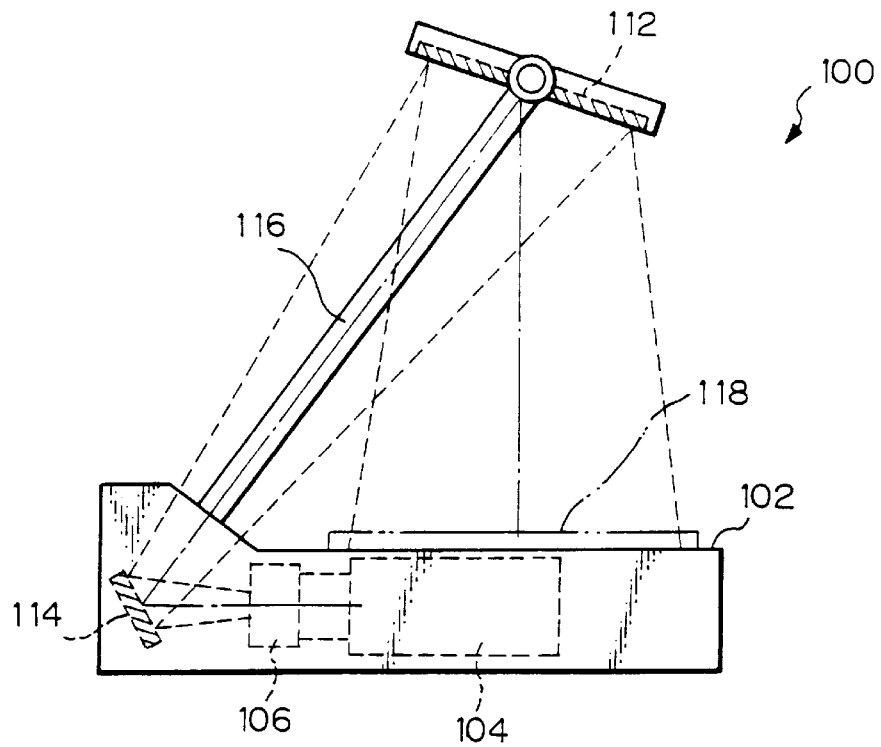
FIGS. 5A and 5B are respectively a side elevation and a front view showing still another conventional image pick-up device.
Figure 5B:
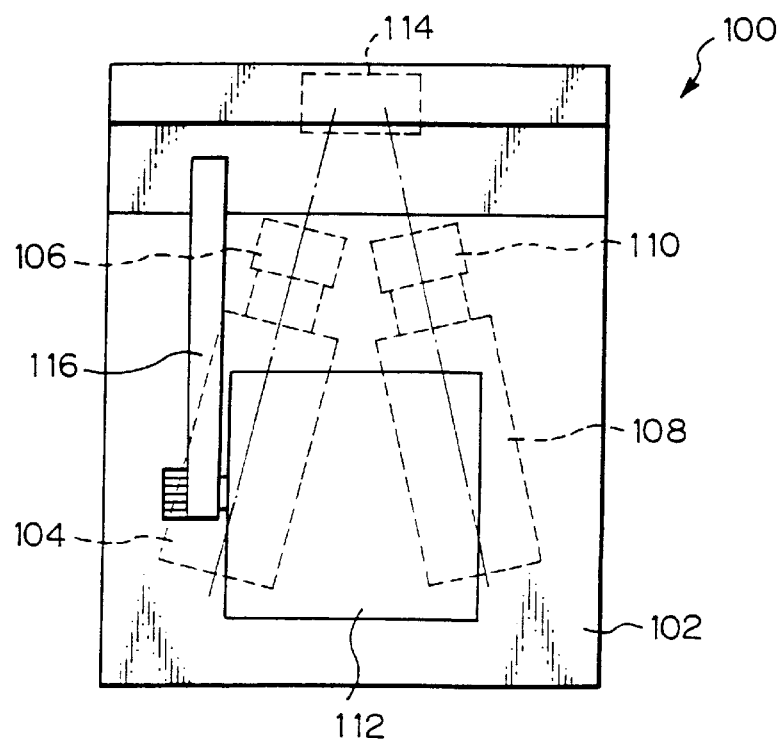

FIGS. 5A and 5B show still another conventional image pick-up device using a projector type light source unit, as taught in Japanese Patent Laid-Open Publication No. 4-13916. As shown, the device, generally 100, is made up of a stage 102 loaded with a document or similar subject 118, a TV camera 104, an image pick-up lens 106, a projector type light source unit 108, a projection lens 110, a first mirror 112, a second mirror 114, and an arm 116 supporting the mirror 112. Light issuing from the light source unit 108 is incident to the mirror 114 via the projection lens 110. The light reflected by the mirror 114 is again reflected by the mirror 112 and then incident to the subject 118 at a predetermined angle. The resulting imagewise reflection from the document 118 is sequentially reflected by the mirrors 112 and 114 and then incident to the lens 106 as a noninverted image, as in the conventional device shown in FIGS. 4A and 4B. The camera 104 transforms the incident light to a usual video signal. The image represented by the video signal appears on, e.g., a TV monitor, not shown. Because the light from the light source unit 108 illuminates the document 118 at the predetermined angle, a minimum of light is allowed to leak due to the diffusion. Because the light source unit 108 can be freely cooled by a fan or similar cooling means, heat output from the light source unit 108 is prevented from being transferred to the speaker or the operator and deteriorating the working environment. If the lenses 106 and 110 are implemented by zoom lenses and interlocked to each other, the illuminating range and shooting range will coincide with each other.

However, for the lenses 106 and 110, use is made of expensive lenses having substantially the same specifications. This increases the production cost of the device 100. Further, the optical axis of the illumination line consisting of the light source unit 108, lens 110 and mirrors 114 and 112 and the optical axis of the pick-up line consisting of the camera 104, lens 106 and mirrors 114 and 112 must be accurately coincident with each other, resulting in time- and labor-consuming adjustment.

The embodiment to be described eliminates the above problems, particularly the problems (5) through (7) stated earlier.

Figure 6A:
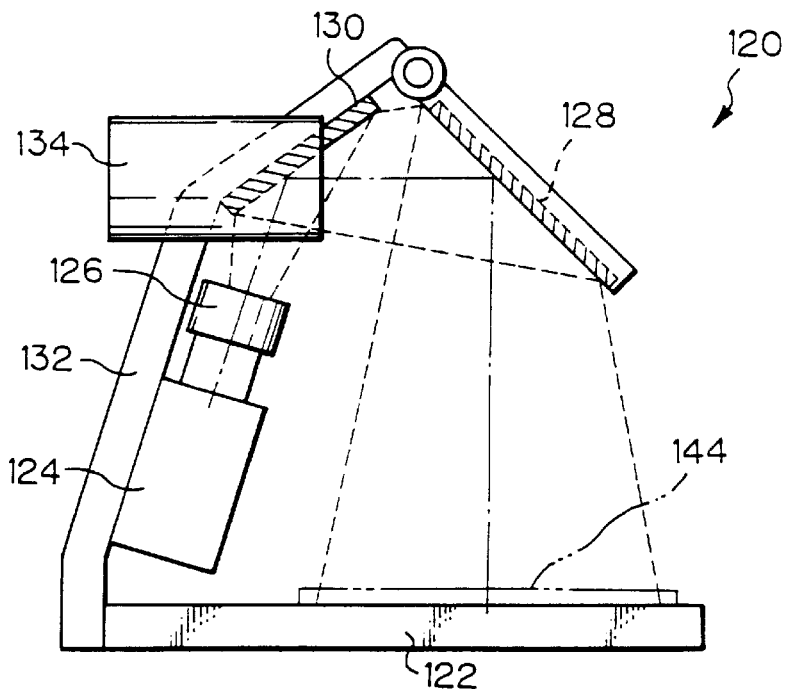
FIGS. 6A and 6B are respectively a side elevation and a front view showing a second embodiment of the present invention.
Figure 6B:
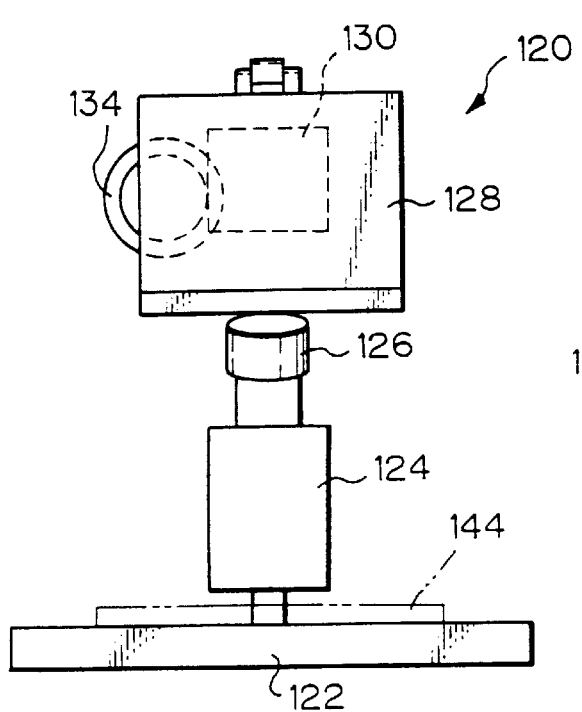
Figure 7:
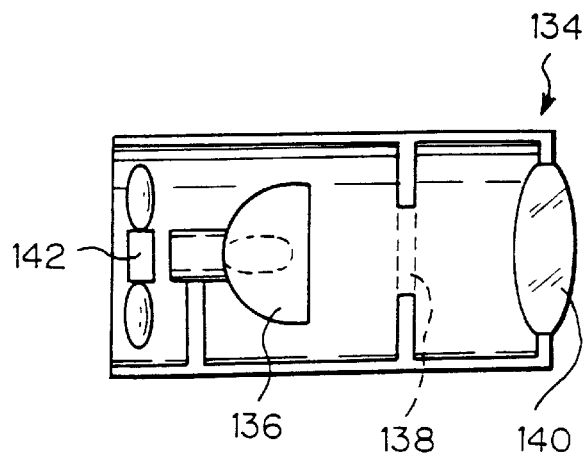
FIG. 7 is a section of a light source unit included in the second embodiment.

Referring to FIGS. 6A and 6B, the embodiment is implemented as an image pick-up device 120 having a stage 122 loaded with a document or similar subject 144, a TV camera 124, an image pick-up lens 126, a first mirror 128, a second mirror 130, an arm 132 supporting the mirrors 128 and 130, and a light source unit 134 mounted on the arm 132. As shown in FIG. 7, the light source unit 134 consists of a lamp 136, a projection frame 138 a projection lens 140, and a fan 142 for cooling the lens 140 and lamp 136. The lamp 136 is implemented by, e.g., a halogen lamp having a mirror on which a dichroic film is formed by vacuum deposition. The dichroic film transmits needless heat rays to the rear thereof, so that only visible rays are issued forward as parallel rays.

The projection frame 138 is formed at the center thereof with an opening substantially similar in shape to the illuminating range on the stage 122, thereby playing the role of a screen plate. With this configuration, the frame 138 prevents the light from leaking to the outside of the device 120. The lens 140 projects the light from the lamp 136 onto the stage 122 in an enlarged scale. Usually, the focal distance (f number) of the lens 140 is selected such that the image of the opening of the frame 138 is focused onto the stage 122.

In operation, the light issuing from the light source 134 is reflected by the mirror 128, i.e., only once and then incident to the document 144 laid on the stage 122. The resulting reflection from the document 144 is sequentially reflected by the mirrors 128 and 130 and then incident to the lens 126 as a noninverted image. The camera 124 transforms the incident light to a usual video signal. As a result, the image represented by the video signal appears on, e.g., a TV monitor, not shown.

The device 120 has various unprecedented advantages, as follows. The light from the light source unit 134 illuminates the stage 122 at a preselected angle after being reflected only once. This, coupled with the fact that the illumination by the light source unit 134 is confined in a particular range by the frame 138 and lens 140, noticeably reduces the leakage of the light to the outside of the device 120, compared to the prior art device 70 using fluorescent lamps (FIGS. 4A and 4B). Particularly, when the device 120 is used in combination with a large projector whose illumination is inherently low in a decision room or a conference room, a minimum of light, if leaked, is incident to the screen of the projector. Moreover, the device 120 prevents leaked light from being incident to the speaker's eyes or the operator's eyes, thereby freeing the speaker or the operator from fatigue.

The fan 142 dissipates heat generated by the lamp 136 to the rear or to the sides of the device 120. This eliminates an occurrence that the heat output from the light source unit 134 is transferred to the speaker or the operator standing in front of the device 120 and thereby deteriorates the working environment, as described with reference to FIGS. 4A and 4B. In addition, the light source unit 134 is located as remote from the speaker or the operator as possible, so that the speaker or the operator is protected from a burn.

Further, the light source unit 134 is extremely simple and inexpensive because it needs only the lamp 136, frame 138, lens 140, and fan 142. This is contrastive to the prior art device 70 (FIGS. 4A and 4B) which needs two expensive lenses having substantially the same specifications. The optical axis of the illumination line including the light source unit 134 and mirror 128 can be readily adjusted because reflection occurs only once. Hence, the number of adjusting steps is far smaller than in the prior art device 100 (FIGS. 5A and 5B).

Figure 8A:
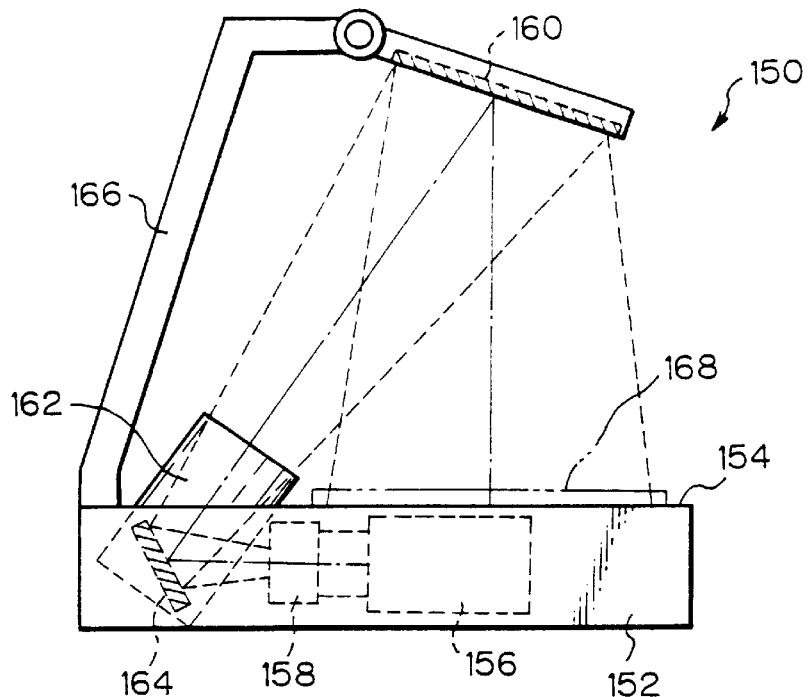
FIGS. 8A and 8B are respectively a side elevation and a front view showing a modification of the second embodiment.
Figure 8B:
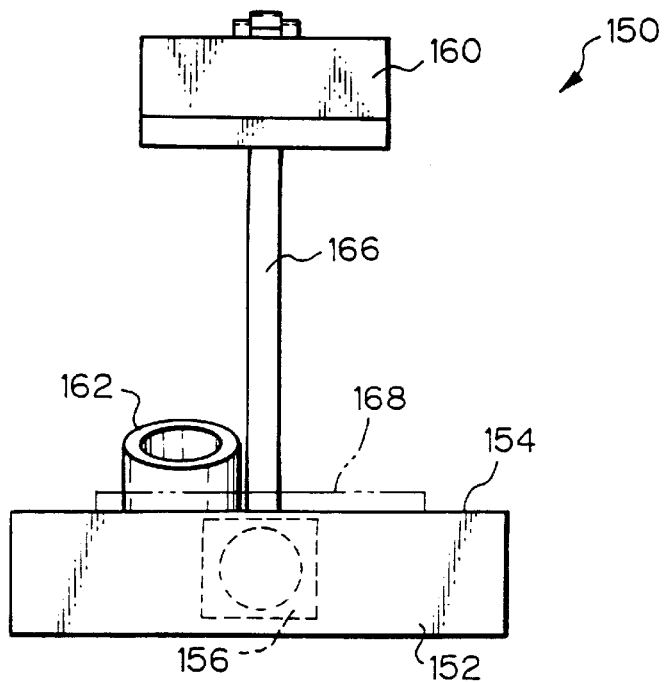

FIGS. 8A and 8B show a modified form of the second embodiment. As shown, an image pick-up device, generally 150 has a casing 152, a stage 154 loaded with a document or similar subject 168, a TV camera 156, an image pick-up lens 158, a first mirror 160, a light source unit 162, a second mirror 164, and an arm 166 supporting the mirror 160. The modification differs from the above embodiment in that the camera 156, lens 158, mirror 164 and light source unit 162 are accommodated in the casing 152. In this sense, the modification will be achieved if FIG. 6A showing the second embodiment is turned 90 degrees counterclockwise, and if the arm 166 supporting the mirror 160 is slightly increased in length such that the stage 154 lies above the camera 156. Regarding the individual constituent part, the modification is exactly the same as the second embodiment in operation and effect. The light source unit 162 is identical in structure and operation with the light source unit 134 shown in FIGS. 6A and 6B, and therefore will not be described specifically in order to avoid redundancy.

In operation, the light issuing from the light source unit 162 is reflected by the mirror 160, i.e., only once and then incident to the document 168 laid on the stage 154. The resulting imagewise reflection from the document 168 is sequentially reflected by the mirrors 160 and 164 and then incident to the lens 158 as a noninverted image. The camera 156 transforms the incident light to a usual video signal. The image represented by the video signal appears on, e.g., a TV monitor, not shown.

The modification achieves exactly the same advantages as the second embodiment, although not described in order to avoid redundancy.

As stated above, the devices 120 and 150 each reduces the leakage of light, prevents heat generated by the light source unit 134 or 162 from being transferred to the speaker or the operator standing in front of the device 120 or 150, reduces the production cost, and reduces the number of adjusting steps.

3rd Embodiment

Figure 9A:
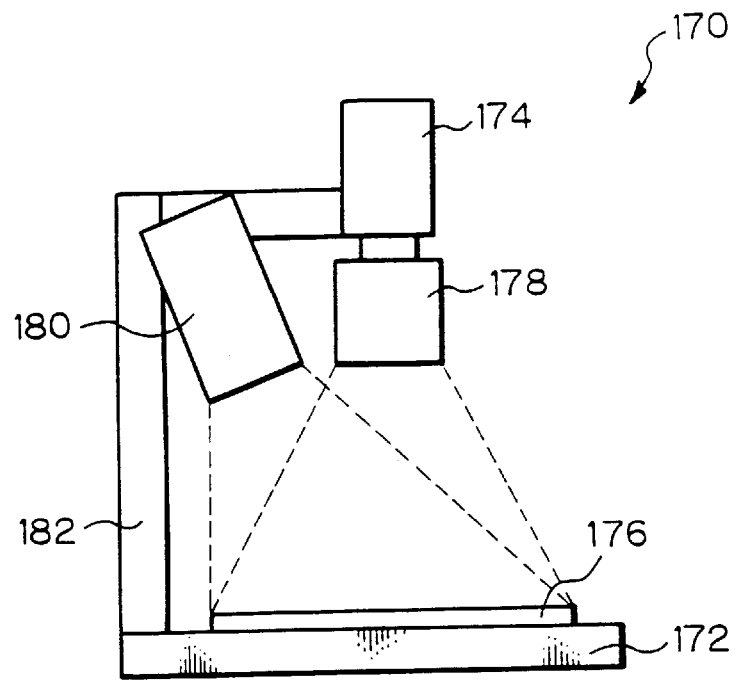
FIGS. 9A and 9B are respectively a side elevation and a front view showing a further conventional image pick-up device.
Figure 9B:
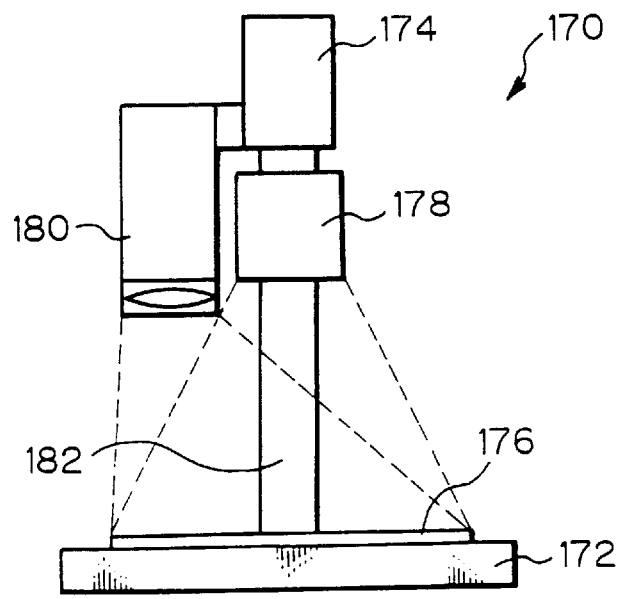
Figure 10:
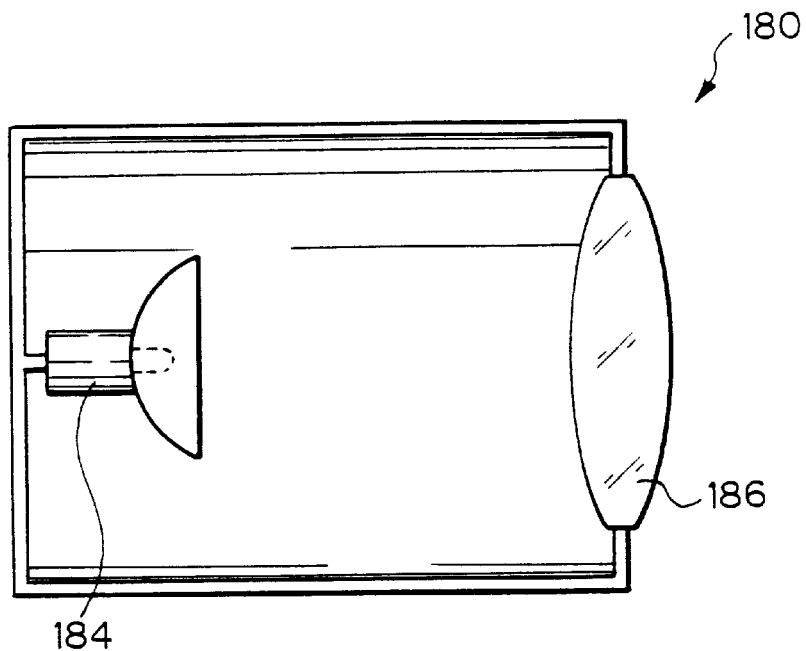
FIGS. 10 and 11 each shows a particular conventional light source unit for an image pick-up device.

First, problems to be solved by this embodiment will be discussed. FIGS. 9A and 9B show a further conventional image pick-up device. As shown, the device, generally 170, has a stage 172 loaded with a document or similar subject 176, a TV camera 174 for shooting the document 176 via its lens 178, a light source unit 180 for illuminating the stage 172, and an arm 182. As shown in FIG. 10, the light source 180 has a lamp 184 and a condensing lens 186 for condensing light issuing from the lamp 184.

Figure 11:
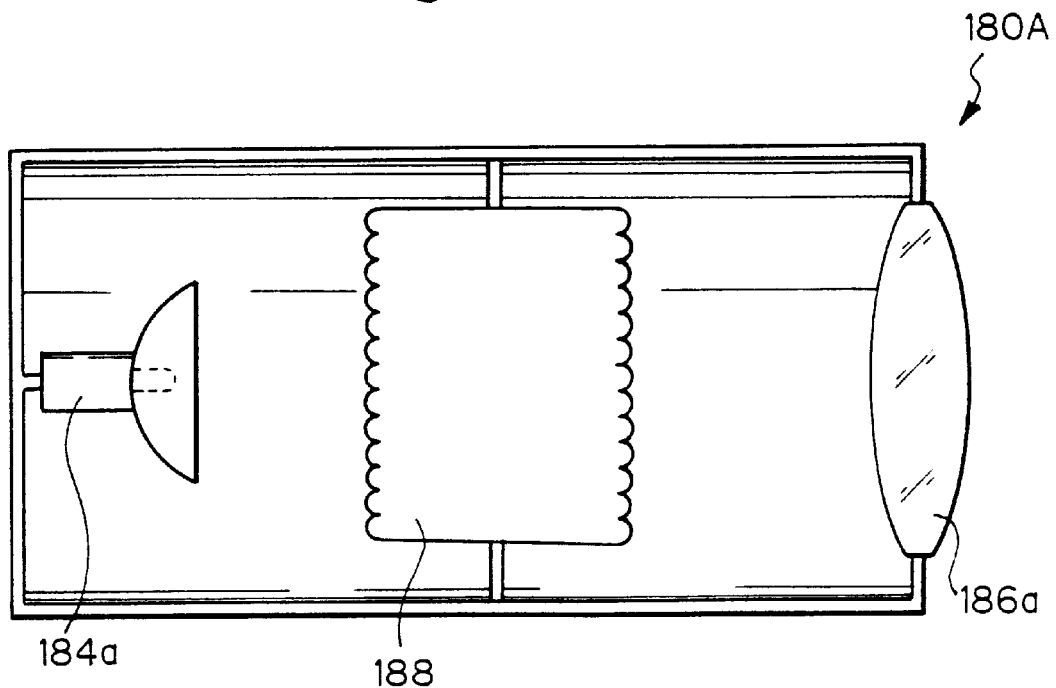

The problem with the device 170 is that the light incident to the stage 172 involves irregularity due to shading particular to the lens 186 and the irregular distribution of the light issuing from the lamp 184, thereby lowering the quality of the output image. In light of this, as shown in FIG. 11, an integrator 188 may be interposed between a lamp 184a and a condensing lens 186a. Although this kind of scheme reduces the irregular light distribution on the stage 172, it increases the production cost due to the expensive integrator 188 and wastes space.

The embodiment to be described eliminates the above problems, particularly the problem (8) stated earlier.

Figure 12:
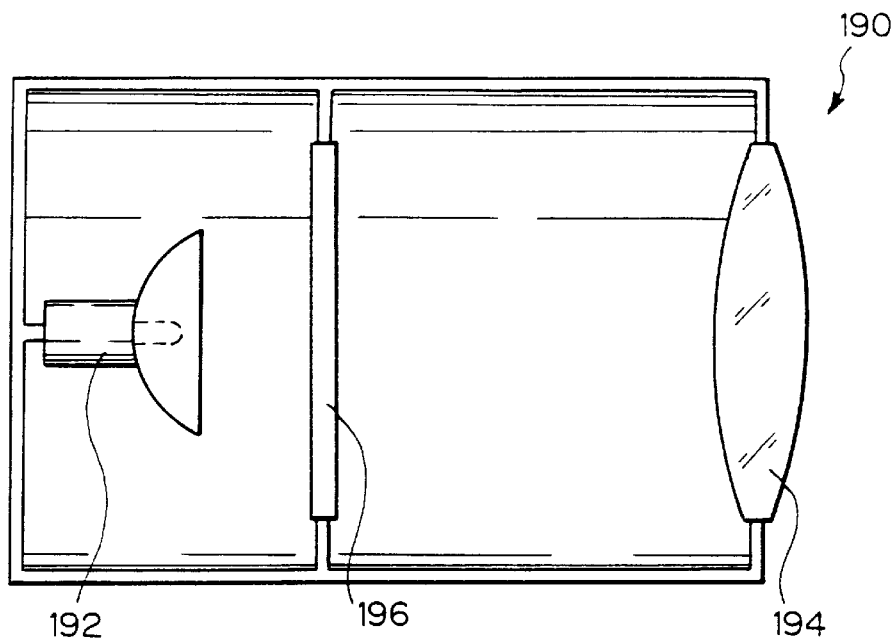
FIG. 12 shows a light source unit applicable to a third embodiment of the present invention.

Referring to FIGS. 12, 13, 14A and 14B, the third embodiment, particularly an improved light source unit thereof, will be described. A light source unit 190 included in the embodiment is also applicable to the prior art device 1 70 shown in FIGS. 9A and 9B. As shown in FIG. 12, the light source unit 190 has a lamp 192, a condensing lens 194, and a gradient filter 196. The lamp 192 is comprised of, e.g., a halogen lamp having a mirror. A dichroic film is formed on the mirror by vacuum deposition so as to transmit needless heat rays to the rear. As a result, only visible rays are emitted forward in the form of parallel rays. The lens 194 projects the light issuing from the lamp 192 onto the stage 172 in an enlarged scale. The gradient filter 196 is an optical filter whose transmissivity is higher in its peripheral portion than its central portion. The filter 196 corrects the irregularity of the light which illuminates the stage 172 via the lens 194.

Figure 13:
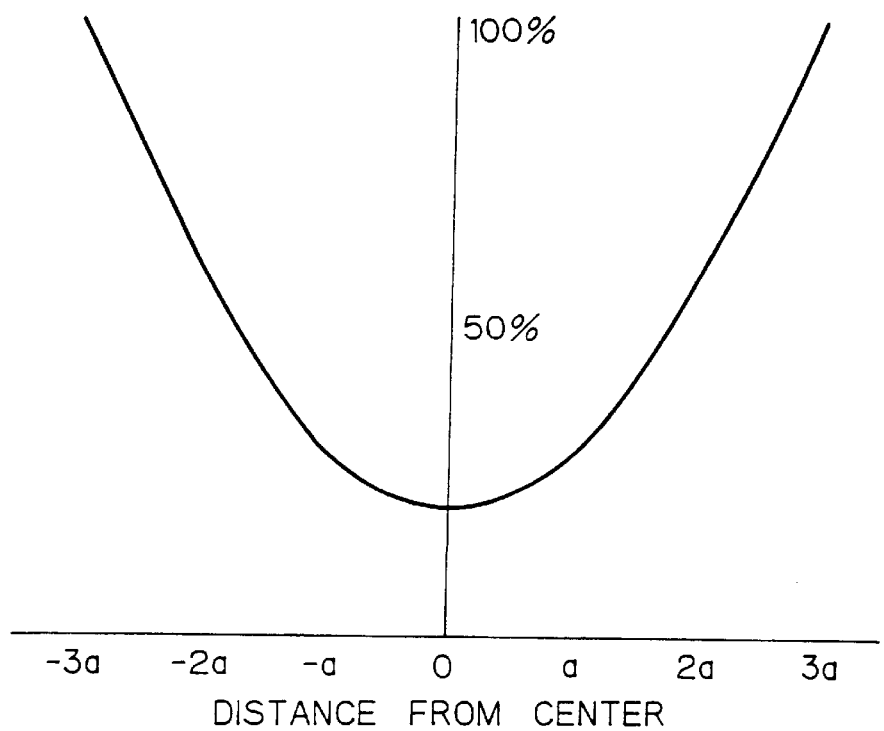
FIG. 13 is a graph indicative of a transmission characteristic particular to a gradient filter included in the light source unit of FIG. 12.

FIG. 13 shows a specific transmission characteristic of the gradient filter 196. Generally, the transmission characteristic of the filter 196 is selected to be opposite to the illumination distribution of the light issuing from the lamp 192 and incident to the stage 172 via the lens 194.

While the gradient filter 196 may be formed by the vacuum deposition of chromium on a glass substrate, any other method may be used so long as it satisfies the above permeability characteristic.

With the device 1190, it is possible to reduce the irregular illumination distribution ascribable to the lamp 192 and lens 194, thereby protecting the output image from noticeable deterioration. Moreover, this can be done only with the gradient filter 196, i.e., with a minimum of cost and a minimum of space.

Figure 14A:
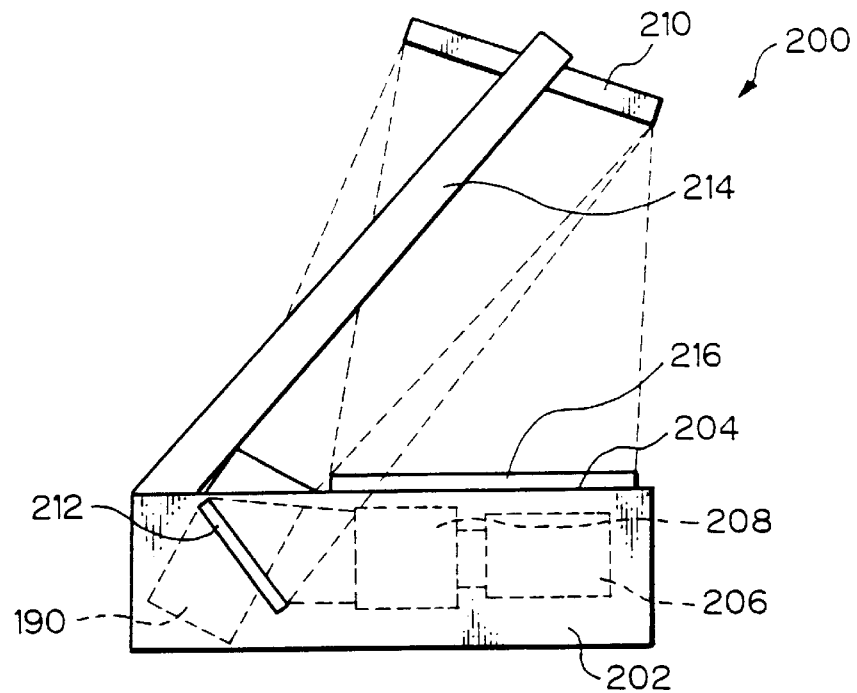
FIGS. 14A and 14B are respectively a side elevation and a front view showing the third embodiment including the light source unit of FIG. 12.
Figure 14B:
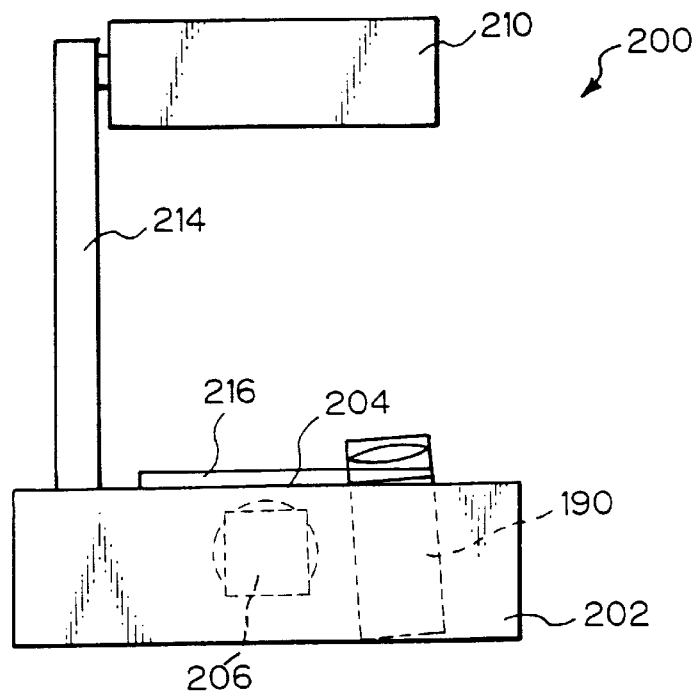

FIGS. 14A and 14B show another image pick-up device 200 also accommodating the light source unit 190. As shown, the device 200 has a stage 204 loaded with a document or similar subject 216, a TV camera 206, an image pick-up lens 208, a first mirror 210, a second mirror 212, an arm 214 supporting the mirror 210, and the light source unit 190. In operation, light issuing from the light source unit 190 is reflected by the mirror 210, i.e., only once and then incident to the document 216 laid on the stage 204. The resulting imagewise reflection from the document 216 is sequentially reflected by the mirrors 210 and 212 and then incident to the lens 208 as a noninverted image. The camera 206 transforms the incident light to a usual video signal. The image represented by the video signal appears on, e.g., a TV monitor.

As stated above, the illustrative embodiment is capable of reducing irregularity in illumination with a simple arrangement, thereby preventing the quality of the output image from being lowered. Because the gradient filter 196 is small size and relatively low cost, the entire image pick-up device is reduced in size and production cost.

Various modifications will become possible for those skilled in the art after receiving the teachings of the present disclosure without departing from the scope thereof.

What is claimed is:

1. An image pick-up device comprising:

a stage to be loaded with a subject;

image pick-up means for picking up an optical image representative of the subject; and illuminating means for illuminating the subject;

said illuminating means comprising a light source for emitting light, an optical filter having transmissivity higher in a peripheral portion thereof than in a central portion thereof, and for passing the light output from said, light source therethrough, and condensing means for condensing the light passed through said optical filter.

2. A device as claimed in claim 1, wherein said image pick-up means comprises a TV camera.

3. A device as claimed in claim 1, wherein said light source of said illuminating means comprises a halogen lamp, wherein said optical filter comprises a gradient filter, and wherein said condensing means comprises a condensing lens.

* * * * *